United States Patent [19]
Falberg

[11] Patent Number: 5,580,371
[45] Date of Patent: Dec. 3, 1996

[54] CORROSION RESISTANT, WELDABLE COATING COMPOSITIONS

[75] Inventor: Gregg M. Falberg, New York, N.Y.

[73] Assignee: International Zinc, Coatings & Chemical Corp., New York, N.Y.

[21] Appl. No.: 645,209

[22] Filed: May 13, 1996

[51] Int. Cl.⁶ .................................................. C09D 5/10
[52] U.S. Cl. .................... 106/14.12; 106/287.1; 106/635
[58] Field of Search ............................. 106/14.12, 635, 106/287.1, 403, 456, 457

[56] References Cited

U.S. PATENT DOCUMENTS

| | | | |
|---|---|---|---|
| 3,620,784 | 11/1971 | Schutt | 106/623 |
| 4,011,088 | 3/1977 | Makishima et al. | 106/14.21 |
| 4,162,169 | 7/1979 | Schutt | 106/634 |

*Primary Examiner*—Anthony Green
*Attorney, Agent, or Firm*—Heslin & Rothenberg, P.C.

[57] ABSTRACT

A zinc-based anti-corrosive coating is disclosed. The coating includes zinc, iron phosphide, and potassium silicate having a molar ratio of silicate to potassium of 4.1 to 6.0.

12 Claims, No Drawings

5,580,371

CORROSION RESISTANT, WELDABLE COATING COMPOSITIONS

FIELD OF THE INVENTION

The invention relates to an anticorrosive coating composition that does not interfere with welding. The composition includes zinc, iron phosphide and an aqueous potassium silicate solution containing a high ratio of silicate to potassium.

BACKGROUND OF THE INVENTION

In marine and industrial construction, it is usually desirable to pre-paint steel with a zinc-rich primer before fabrication, and many such coating compositions are known. Many of these compositions include zinc powder in an organic resin such as an epoxy resin, a chlorinated rubber, a polystyrene resin or a silicone resin. Coatings based on these organic binders are not well suited for coating steel that must ultimately be welded because the binder tends to decompose from the heat of the weld, resulting in damaged coatings and loss of adhesion.

As an alternative to coatings based on organic binders, zinc coatings based on inorganic binders are also known. For example, Schutt (U.S. Pat. No. 3,620,784) discloses a coating composition containing zinc dust carried in a silicate vehicle. The particular formulation disclosed by Schutt is said to avoid many of the problems commonly encountered with inorganic coatings: weather wear, cracking, crazing and non-uniform adherence before and after baking.

However, even if one surmounts the problems associated with the physical characteristics of the applied silicate coating, as Schutt claims to have done, one is still faced with the problem of welding steel that has been coated with zinc dust primer in a silicate vehicle. During welding the vaporized zinc can penetrate the weld root and become entrapped, creating a porous weld. It is sometimes possible to partially overcome the porosity problem by reducing the welding speed sufficiently to allow the zinc to become completely volatized ahead of the weld. Even when this technique is successful, however, it results in increased fabrication costs due to reduced welding speed.

It is known that a portion of zinc in zinc-rich primers can be replaced by iron phosphide of suitable particle size. The resulting zinc-coated steel, while retaining its anti-corrosive properties, can be more readily and efficiently welded.

As an example of this approach, Makishima et al. (U.S. Pat. No. 4,011,088) have proposed an anti-corrosive coating composition comprising 5 to 80% of a binder, which is either potassium silicate or ammonium silicate, and 20 to 95% of a pigment mixture of zinc powder and iron phosphide or zinc powder and nickel phosphide. In the embodiment in which potassium silicate is used as the binder, Makishima et al. indicate that the ratio of silicate to potassium should be between 2.5 and 4.0. If the mole ratio is smaller than 2.5, the film forming property is said to be insufficient and if the mole ratio is larger than 4.0, the stability of the binder is said to be reduced.

I have now discovered an improved zinc based primer that provides a durable, corrosion-resistant coating, combined with excellent weldability. Moreover, the composition is water based and thereby avoids the environmental problems associated with solvent-based primers.

SUMMARY OF THE INVENTION

The invention relates to an anticorrosive coating composition comprising: (a) from 8 to 40 parts by weight of a pigment, said pigment comprising a mixture of from 35 to 90 percent by weight of zinc and from 65 to 10 percent by weight iron phosphide; (b) from 2 to 5 parts by weight of potassium silicate of formula $K_2O.nSiO_2$ wherein n is from 4.1 to 6.0; and (c) from 7 to 12 parts by weight of water. Preferably the zinc and the iron phosphide are of median particle size between 2 µm and 20 µm; most preferably 3 to 8 µm median particle size. The ratio of silicate to potassium in the potassium silicate of the inventive composition may be from 4.5 to 6.0; more preferably 5.3 to 6.0; and most preferably 5.0 to 5.3. Compositions according to the invention may additionally include lithium silicate $Li_2O.pSiO_2$ wherein p is from 3.0 to 8.0 or sodium silicate $Na_2O.mSiO_2$ wherein m is from 2.0 to 4.0, or a combination of the two. Compositions according to the invention may also include a filler such as mica.

In a preferred embodiment, the invention comprises (a) from 23 to 28 parts by weight of a pigment; (b) from 3 to 4 parts by weight of potassium silicate wherein n is from 5.0 to 5.5; and (c) from 9 to 10 parts by weight water. The pigment in this case is a mixture of from 45 to 55 percent by weight of zinc and from 45 to 55 percent by weight iron phosphide;

DETAILED DESCRIPTION OF THE INVENTION

The coating composition of the invention comprises three basic elements: (a) a zinc-iron phosphide pigment; (b) a potassium silicate binder; and (c) an amount of water to provide the appropriate rheology. The compositions may also contain compatible fillers and dyes, which should not, however, adversely affect the durability or weldability of the resultant composition.

The zinc-iron phosphide pigment consists of a mixture of metallic zinc in the form of a powder or flakes and particles of roughly the same size of iron phosphide. Zinc dust is preferred, and it is readily commercially available. I have found that UP6 zinc dust from North American Oxide (Clarksville, Tenn.) having an average particle size of 6 to 7 microns is suitable for the composition of the invention. Iron phosphide is also commercially available, and I have found that Grade 2131 Ferrophos®, available from Occidental Chemical Corporation (Niagara Falls, N.Y.) having a mean particle size between 3 and 5 microns is well suited for the compositions of the invention. Ferrophos® is primarily iron phosphide ($Fe_2P$) with minor amounts of $SiO_2$. Details of its preparation and constitution may be found in U.S. Pat. No. 3,562,124 (see column 3, line 45 to column 4, line 33), the entire disclosure of which is incorporated herein by reference.

The weight ratio of zinc in the pigment should be greater than 35% in order to provide adequate protection against corrosion, but it cannot be higher than 90% without giving rise to porous welds. Other pigments and fillers may be added to composition of the invention as long as the percentages of zinc and iron phosphide are maintained within the stated range. Examples of fillers that could be added include diatomaceous earth, bentonite clay, kaolinite, wollastonite, talc and mica.

The binder is potassium silicate having a mole ratio of silica to potassium oxide greater than 4.0. Aqueous solutions of potassium silicate are commercially available and are prepared by the method disclosed in U.S. Pat. No. 4,162,169, the entire disclosure of which is incorporated herein by reference. I have found that the commercially available K-silicate™ from Polyset Chemical Co. (Mechanicville, N.Y.) is well suited to the compositions of the invention. This material is about 23–28% by weight potassium silicate in water (i.e. 23–28% solids content) and the mole ratio of silicate to potassium is about 5.2.

While not necessary to produce coating compositions of the invention, other alkali metal silicates may be added to the binder. In this regard one may add either or both of lithium silicate ($Li_2O \cdot pSiO_2$ wherein p is from 3.0 to 8.0) and sodium silicate ($Na_2O \cdot mSiO_2$ in which m is from 2.5 to 4.0).

A composition of the invention is prepared by blending 3.17 kilograms of UP6 zinc powder to homogeneity with 3.17 kilograms of 2131 Ferrophos® (iron phosphide) in a high speed blender. The homogenous mixture is combined with 3.31 kilograms of K-silicate™ (potassium silicate) and stirred to produce 3.78 liters of a homogeneous mixture according to the invention.

As discussed above, if a filler such as mica is to be added, it would be blended together with the zinc and iron phosphide before mixing with the silicate vehicle. Similarly, if a lithium silicate or sodium silicate were to be added to the composition, it would be mixed with the potassium silicate aqueous vehicle before combining with the pigment.

The substrates to which the compositions of the invention are applied will commonly be metal. Indeed, the major advantage of the present compositions, weldability, is observed when the substrate is steel. For steel substrates, the substrate is usually cleaned with phosphoric acid or sand blasting immediately before application of the coating. The coating is sprayed, brushed or rolled on the substrate by conventional means. It spreads well and adheres uniformly. The resulting coating resists corrosion and abrasion; it does not crack or peel and it weathers well.

I claim:

1. An anticorrosive coating composition comprising:
   (a) from 8 to 40 parts by weight of a pigment, said pigment comprising a mixture of from 35 to 90 percent by weight of zinc and from 65 to 10 percent by weight iron phosphide;
   (b) from 2 to 5 parts by weight of potassium silicate of formula $K_2O \cdot nSiO_2$ wherein n is from 4.1 to 6.0; and
   (c) from 7 to 12 parts by weight water.

2. A composition according to claim 1 in which said zinc and said iron phosphide are of median particle size between 2 μm and 20 μm.

3. A composition according to claim 2 in which said zinc and iron phosphide are of 3 to 8 μm median particle size.

4. A composition according to claim 1 wherein n is from 4.5 to 6.0.

5. A composition according to claim 1 wherein n is from 5.0 to 6.0.

6. A composition according to claim 1 wherein n is from 5.3 to 6.0.

7. A composition according to claim 1 wherein n is from 5.0 to 5.3.

8. A composition according to claim 1 additionally comprising lithium silicate $Li_2O \cdot pSiO_2$ wherein p is from 3.0 to 8.0.

9. A composition according to claim 1 additionally comprising sodium silicate $Na_2O \cdot mSiO_2$ wherein m is from 2.0 to 4.0.

10. A composition according to claim 1 additionally comprising a filler.

11. A composition according to claim 10 wherein said filler is mica.

12. A composition according to claim 1 comprising:
    (a) from 23 to 28 parts by weight of a pigment, said pigment comprising a mixture of from 45 to 55 percent by weight of zinc and from 45 to 55 percent by weight iron phosphide;
    (b) from 3 to 4 parts by weight of potassium silicate of formula $K_2O \cdot nSiO_2$ wherein n is from 5.0 to 5.5; and
    (c) from 9 to 10 parts by weight water.

* * * * *

UNITED STATES PATENT AND TRADEMARK OFFICE
CERTIFICATE OF CORRECTION

PATENT NO. : 5,580,371
DATED : Dec. 3, 1996
INVENTOR(S) : Gregg M. Falberg

It is certified that error appears in the above-indentified patent and that said Letters Patent is hereby corrected as shown below:

<u>In the specification and claims</u>:

In all instances replace "$K_2O \cdot nSiO_2$" with $K_2O \cdot nSiO_2$; "" with $Li_2O \cdot SiO_2$ and "$Na_2O \cdot mSiO_2$" with $Na_2O \cdot mSiO_2$.

Signed and Sealed this

Twenty-second Day of April, 1997

*Attest:*

BRUCE LEHMAN

*Commissioner of Patents and Trademarks*

*Attesting Officer*